Dec. 15, 1925.

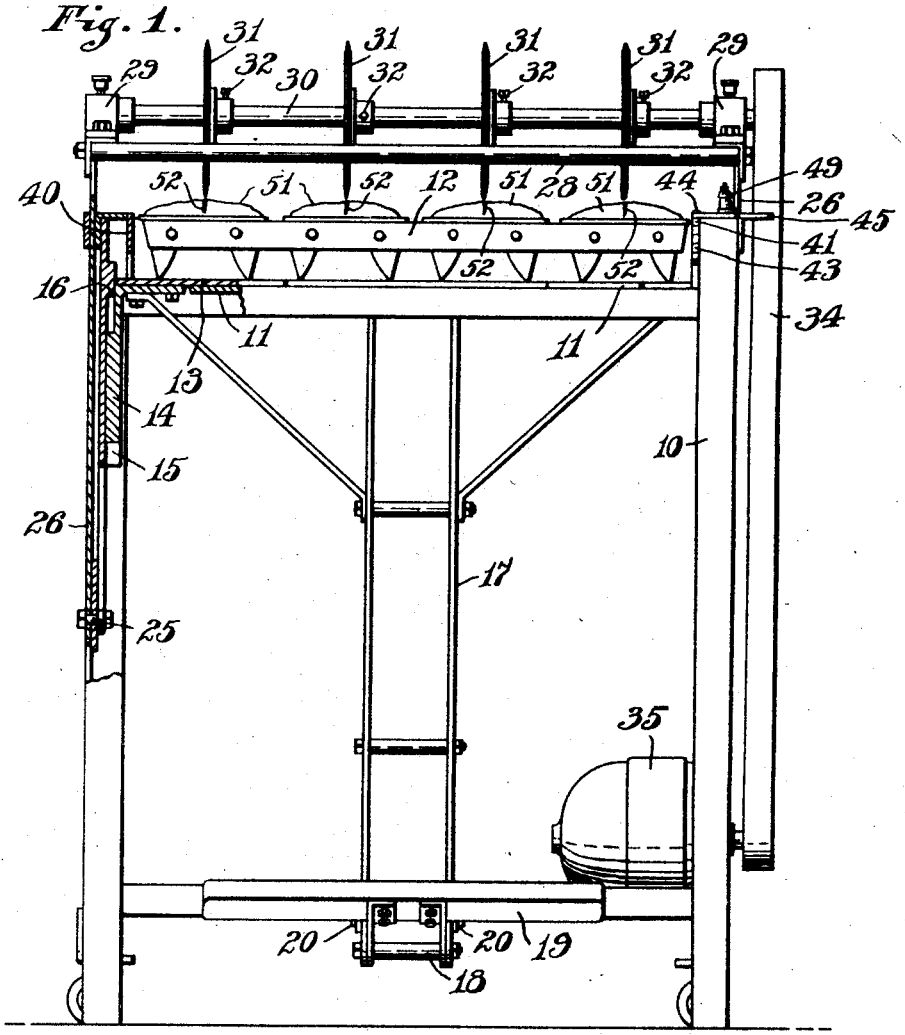
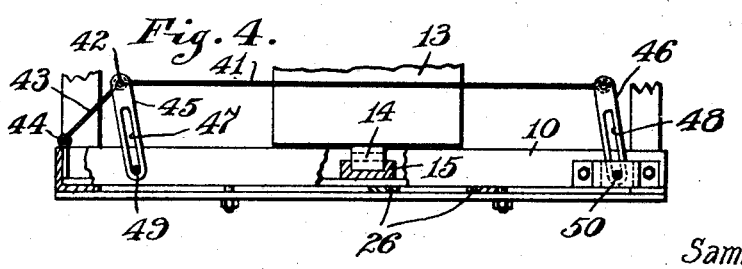

S. ANDRUS 1,565,887

DOUGH LOAF SLASHER

Filed March 30, 1925    2 Sheets-Sheet 2

INVENTOR

Samuel Andrus,

BY

Hood + Hahn.

ATTORNEYS

Patented Dec. 15, 1925.

1,565,887

UNITED STATES PATENT OFFICE.

SAMUEL ANDRUS, OF TERRE HAUTE, INDIANA, ASSIGNOR TO JERRY FITZGERALD, OF TERRE HAUTE, INDIANA.

DOUGH-LOAF SLASHER.

Application filed March 30, 1925. Serial No. 19,301.

*To all whom it may concern:*

Be it known that I, SAMUEL ANDRUS, a citizen of the United States, residing at Terre Haute, in the county of Vigo and State of Indiana, have invented a new and useful Dough-Loaf Slasher, of which the following is a specification.

In the process of baking bread loaves it has been found advisable, after the dough loaves have been "proofed", to slash each loaf in order to prevent the loaf from rising too much and becoming distorted during the baking process. Such slashing has heretofore been done either by hand manipulated knives or by rather a complicated mechanism.

The object of my present invention is to provide a simple hand controlled machine by means of which the loaves may be uniformly and quickly slashed.

The accompanying drawings illustrate my invention.

Fig. 1 is a front elevation, in partial vertical section, of an embodiment of my invention;

Fig. 4 is a fragmentary horizontal section of the adjustable guide.

Figure 2:
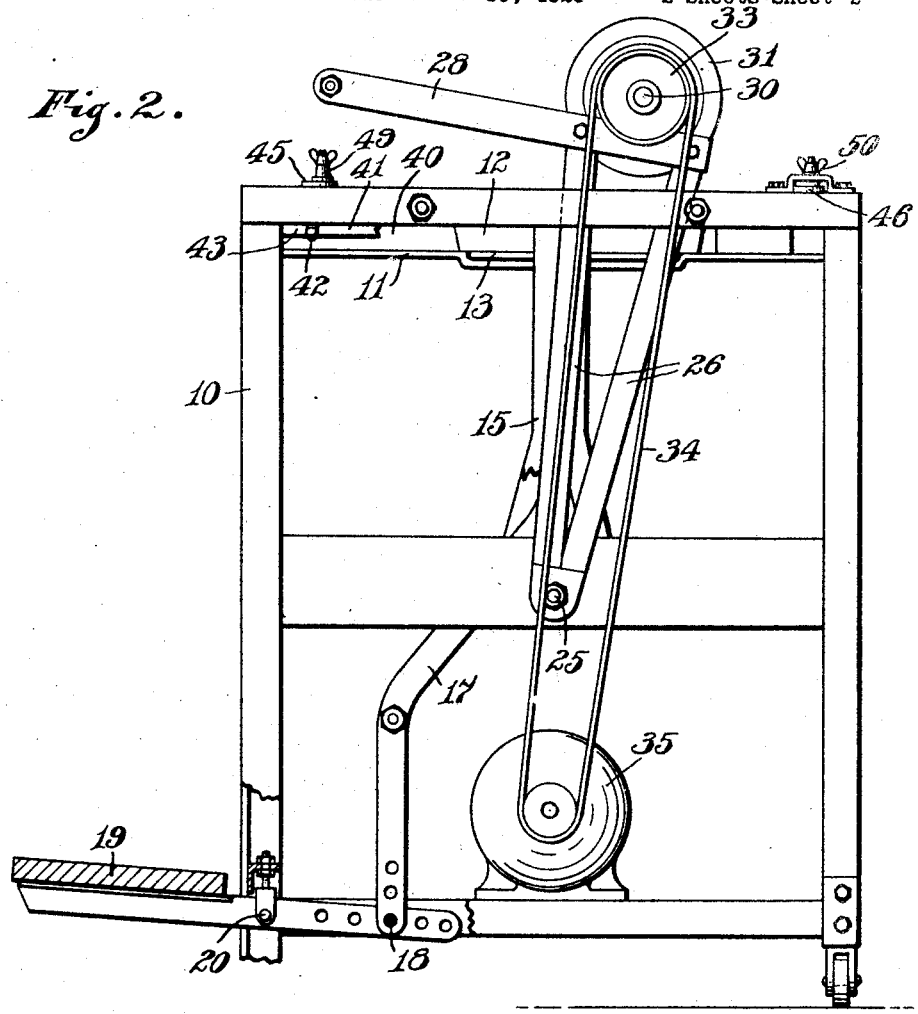
Fig. 2 is a side elevation in partial vertical section.
Figure 3:
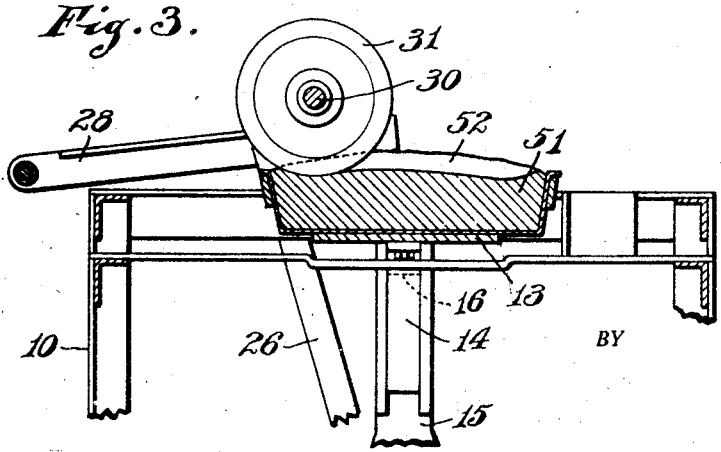
Fig. 3 is a fragmentary section through one of the loaves and containing pans.

In the drawings 10 indicates a suitable supporting frame having guide strips 11 arranged to form a support and guide for a group of baking pans 12, each of said strips 11 being depressed at its middle, as clearly shown in Fig. 2, to form a seat for a pan platform 13 the top of which may be substantially in the same plane with the upper faces of the ends of guide strips 11.

Platform 13 is provided at each end with a depending finger 14 mounted to vertically reciprocate in guides 15 supported by the main frame, said guides being blocked at their upper ends, as shown at 16, to limit the upward movement of the pan platform.

Pan platform 13 is supported by a link structure 17 pivoted at 18 to a foot treadle 19 pivoted at 20 on the main frame, the arrangement being such that the pan platform may be vertically reciprocated by means of the foot treadle.

Pivoted at 25, on frame 10, is a cutter-carrying frame comprising side bars 26 and handle 28.

Mounted upon said frame are journal boxes 29, 29 in which is journaled a shaft 30 upon which are mounted a plurality of disc cutters 31 which are longitudinally adjustable on shaft 30 by any suitable means, such as set screws 32.

Shaft 30 is provided with a driving pulley 33 driven by a belt 34 from a motor 35, the arrangement being such that the cutters 31 may be caused to traverse the space over the pan platform 13.

Baking pans 12 are generally arranged in a group of four which may be handled as a unit and the sizes of the units may vary somewhat depending upon the product which is desired.

In order to accommodate pan units of different sizes I provide a guide strip 40 at one side of the space above platform 13 and at the other side provide an adjustable guide strip 41 hinged at 42 to a strip 43 hinged at 44 to the main frame at the entrance end of the machine. Connected to strip 41 at its ends are pivoted links 45 and 46 having slotted connections 47 and 48 respectively with the main frame, clamping means 49 and 50 being provided to clamp the links in any desired position of adjustment so that guide strip 41 may be placed at any desired position from strip 40 so as to serve to properly guide a pan unit into position upon platform 13 beneath knives 31.

In operation a group of pans each containing a proofed dough mass 51, is placed upon platform 13 and, the cutter discs being in fairly rapid rotation, the operator first presses upon treadle 19 so as to raise the dough masses upwardly so that the discs may penetrate the upper regions of the masses and then the cutter carrying frame is drawn forwardly so as to slash a crease 52 lengthwise of each dough mass, whereupon the foot treadle is released so that the pan unit may drop below the cutters and be withdrawn to permit replacement by another pan unit.

The operation can be very rapidly performed and, because the dough masses have been uniformly slashed, without crushing the gas cells, the final baked product is one which is uniform as to texture and appearance.

I claim as my invention:

1. A dough slashing machine comprising a main supporting frame, a pan platform supported thereby, a disc cutter mounted over said platform, a support on said frame for said cutter by which the cutter may be moved back and forth over the platform, and means by which the distance between the platform and cutter may be alternately diminished and increased.

2. A dough slashing machine comprising a main frame, a pan platform mounted therein, a disc cutter mounted over said platform, a support for said cutter by which the cutter may be moved back and forth over the platform, a foot treadle, and connections between said foot treadle and the pan platform by which the platform may be alternately raised and lowered.

3. A dough slashing machine comprising a main frame, a pan platform vertically reciprocable in said main frame, means by which said platform may be vertically reciprocated, a disc cutter arranged over said platform, a swinging support for said disc cutter, and means by which the cutter may be rotated.

4. A dough slashing machine comprising a main frame, a pan platform vertically reciprocable in said main frame, means by which said platform may be vertically reciprocated, pan supporting guides leading to the upper surface of said pan platform when in its lowest position, a disc cutter arranged over said platform, a swinging support for said disc cutter, and means by which the cutter may be rotated.

In witness whereof, I SAMUEL ANDRUS have hereunto set my hand at Terre Haute, Indiana, this 26th day of March, A. D. one thousand nine hundred and twenty-five.

SAMUEL ANDRUS.